United States Patent
Whitaker

[15] 3,661,544
[45] May 9, 1972

[54] A METHOD FOR MAKING THERMOSETTING RESINOUS ABRASIVE TOOLS

[72] Inventor: Noble D. Whitaker, Los Alamitos, Calif.

[73] Assignee: BMI Laboratories, Industry, Calif.

[22] Filed: Nov. 28, 1969

[21] Appl. No.: 880,949

[52] U.S. Cl. ................................................51/295, 51/298
[51] Int. Cl. ....................................B24b 17/00, C08g 51/12
[58] Field of Search ....................................51/293, 295, 298

[56] References Cited

UNITED STATES PATENTS

| | | | |
|---|---|---|---|
| 2,171,635 | 9/1939 | Robie et al. | 51/298 |
| 2,216,135 | 10/1940 | Ranier | 51/298 |
| 2,734,812 | 2/1956 | Robie | 51/298 |
| 2,862,806 | 12/1958 | Nestor | 51/298 |
| 2,939,777 | 6/1960 | Gregor et al. | 51/298 |
| 2,943,926 | 7/1960 | Goedfert | 51/298 |
| 3,156,545 | 11/1964 | Kistler | 51/298 |
| 2,076,517 | 4/1937 | Robie | 51/298 |
| 2,174,755 | 10/1939 | Novotny | 51/298 |
| 2,333,429 | 11/1943 | Kuzmick | 51/298 |
| 2,708,622 | 5/1955 | Stone | 51/298 |

*Primary Examiner*—Donald J. Arnold
*Attorney*—Miketta, Glenny, Poms and Smith

[57] ABSTRACT

A method for producing an abrasive tool or structure which includes the steps of mixing an abrasive composition containing abrasive particles and, preferably, friable particles, with a liquid, multi-stage, thermosetting resin and coating substantially all of the individual particles with the resin; curing the resin to the B-stage while the resin is in contact with the particles to form a fusible solid coating on the particles and forming individual particles coated with said B-stage resin, and placing said resin coated particles in a mold and heating the particles sufficiently to render the resin tacky and fusible and, concurrently, applying sufficient pressure to form a coherent mass of said particles and curing the resin to a hard infusible state to form a high tensile strength bond between said particles. An abrasive tool composed of abrasive particles and lightweight, easily crushable, friable particles uniformly dispersed throughout the abrasive particles, each of the particles being bonded together with a high strength bond formed by a thermosetting resin cured to a hard and infusible state.

12 Claims, No Drawings

A METHOD FOR MAKING THERMOSETTING RESINOUS ABRASIVE TOOLS

BACKGROUND OF THE INVENTION

Generally speaking, two types of abrasive tools (and particularly grinding wheels) are in use today: vitrified tools and resinoid tools. Vitrified wheels are composed of abrasive grain such as fused aluminum oxide or silicon carbide bonded together with ceramic. A resinoid or resin bonded wheel is one in which abrasive particles such as those mentioned above are bonded by adding powdered resins (usually phenolic resins) and the mixture is dampened with reactive plasticizers before cold molding. The resin is cured over a long period of time at about 450° F.

When the abrasive tool is a grinding wheel it is generally preferable to utilize a resin bonded wheel when working at higher speeds. This is due to the fact that resin bonded wheels generally have higher tensile strength than do vitrified wheels. However, even though resin bonded wheels do have higher tensile strength it is still desirable to produce abrasive tools having even greater tensile strengths. Unfortunately, in the prior art methods and in the prior art wheels in order to obtain greater tensile strength it is necessary to utilize a greater amount of resin. This decreases the porosity of the wheel to a great extent because when the wheel is being utilized the resin tends to fill in the interstices or voids at the surface of the wheel masking the sharp edges of the abrasive grain and thus decreasing the effectiveness of the abrasive particles in removing metal or the like from the article being ground.

Moreover, in producing resin wheels it is normal to mold the abrasive particles into final shape by applying pressure but without application of heat and, thereafter, curing the resin. This curing after final molding makes it almost impossible to obtain an abrasive structure having accurate dimensions. In addition, and as noted supra, the methods of the prior art require a long cure cycle after molding which causes warping and the like and prevents one from obtaining a "true" abrasive tool.

It is thus a desideratum in the art to find a fast and economical method for producing grinding wheels having accurate dimensions, high tensile strength, and, at the same time, having the grinding properties of a high porosity wheel.

SUMMARY OF THE INVENTION

It is therefore a principal object of the present invention to provide and embody a method for producing an abrasive tool wherein abrasive particles are bonded together with a resin to form a tool having high tensile strength with a minimum amount of resin.

It is a further object of the present invention to disclose and provide an economical and fast method for producing a high tensile strength grinding wheel.

Another object of the present invention is to embody a method for producing a grinding wheel in which a portion of the method can be completed well in advance of the time in which the final product is produced in order to provide good quality control and rapid production of a final product.

A further object of the present invention is to disclose and provide a method for producing a high tensile strength grinding wheel having a minimum amount of resin bonding the abrasive particles together by providing a uniform coating of bondable resin on each individual particle in which the abrasive particles are originally coated with a liquid resin which is capable of being cured in multi-stages, the first stage being a B-stage in which the resin is solid but fusible and the final stage being a C-stage in which the resin is solid and infusible, i.e. thermoset.

Still another and further object of the present invention is to disclose and provide a method for producing a dense grinding wheel having high tensile strength but the grinding characteristics of a porous wheel by dispersing throughout the wheel friable particles which are easily crushable when in contact with the material to be ground thereby forming voids or interstices on the surface of the grinding wheel when in use to expose sharp edges of the abrasive particles.

A still further object of the present invention is to disclose and provide a method for producing a resin bonded wheel in which the wheel is molded and the resin is cured at the same time and the cure time is very short.

Another object of the present invention is to disclose and provide a grinding wheel which has high tensile strength and high porosity when being utilized, said grinding wheel including abrasive particles and friable particles bonded together with a multi-stage, thermosetting resin.

Generally stated, the foregoing objects and others are accomplished by the present invention by coating abrasive particles and, if desired, friable particles, with a multi-stage, liquid, thermosetting resin in the A-stage so as to easily and efficiently provide a uniform coating of said thermosetting resin around each particle (i.e., both the abrasive and friable particles) and allowing said resin to cure to a B-stage resin (i.e., solid but fusible) while in contact with the said particles so as to form an intermediate composition of particles uniformly coated with solid resin which can be utilized to form an abrasive tool by merely molding under heat and pressure. The abrasive particles coated with the solid and fusible resin can be stock piled for a long period of time under ambient conditions and then utilized to form abrasive tools whenever desired. When a final product is formed the resin coated abrasive particles, which may have other resin coated additives mixed therewith, are then placed into a mold and heated sufficiently to render the resin tacky and fusible and, concurrently, there is applied sufficient pressure to said particles to form a coherent mass of a size and shape corresponding to said mold and then the resin is cured under heat and pressure to a hard and fusible state thereby forming a high strength bond between said particles.

It should be noted that a grinding wheel in which friable, lightweight, and easily crushable particles are uniformly distributed throughout the wheel not only resembles a high porosity wheel from a grinding standpoint (but at the same time has high tensile strength) but has an advantage over high porosity grinding wheel in that the porosity is created only at the point of contact when grinding. Thus the wheel is kept cool and the abrasive grains ability to cut is not diminished but, if coolant is utilized, the coolant does not penetrate into the wheel (which may cause degradation of the bond thereby affecting ultimate strength and wheel balance).

In short, the combination of the strong bond (which allows one to utilize less than half the resin of conventional wheels) produced by the method of the present invention and the addition of friable particles provides a dense structure of high tensile strength for every grade of wheel, thereby minimizing the danger of fracture but still giving at the cutting surface any degree of "openness" or porosity desired. Moreover, grinding wheels of the present invention can be utilized to grind various types of materials. For example, the same wheel can be utilized to grind steel and aluminum as opposed to conventional wheels which would require two separate wheels to grind both aluminum and steel.

DESCRIPTION OF THE PREFERRED EMBODIMENTS

The method of the present invention is well adapted to utilize any multi-stage thermosetting resin available as a liquid. The term "multi-stage" resin as utilized in the specification and claims indicates a resin which goes through stages to form a finally cured infusible solid. For example, the resin is first a low molecular weight liquid and is said to be in the A-stage, with partial curing the resin is advanced to a B-stage in which the resin is solid at ambient temperatures but fusible under heat and pressure, and the resin is then completely cured to the C-stage, a final state in which the resin is a solid infusible mass and will not soften under heat (i.e., thermoset resin).

It is also desirable that the liquid resin utilized to coat the individual abrasive particles have such a viscosity that it is easy to mix the abrasive particles and the resin in order to form a uniform coating around each individual particle. If the resin or organic plastic happens to be too viscous to easily mix the abrasive particles therein, the viscosity can be reduced by merely adding a suitable diluent which can be easily removed (by e.g. heat) when curing the resin to the B-stage. In the alternative, the viscosity of the resin can be reduced by preheating the particles or the resin prior to mixing. However, it should be noted that the viscosity should not be so low that the resin will run off the particles and tend to collect at the bottom of each particle, thereby obtaining a non-uniform coating.

The present invention is not predicated upon the thermosetting resins per se since the thermosetting resins of the type which can be utilized in the present invention are well known and conventional. Hence, a detailed exemplification of the organic plastics or resins contemplated for use in the present invention will not be given herein since such will be apparent to the art skilled; however, in the interest of clarity certain thermosetting resins will be set forth below.

Organic resins which can be utilized in the present invention need to possess the following characteristics:

1. The resin must be thermosetting, i.e. a resin which cures, solidifies, or sets to a solid which will not soften or melt when exposed to heat after being cured; and 2. The resin must be multi-staged, i.e. from an A-stage resin which is either a liquid per se or is soluble in organic solvents there can be formed a B-stage which is a fusible solid and either insoluble or substantially insoluble in organic solvents but is still fusible under heat and pressure, which can be cured to a C-stage which is the final, infusible, crosslinked, thermoset form.

Generally speaking, phenolics, epoxies, alkyds, polyesters, urea-aldehydes, melamine-aldehydes and polyurethanes, are all examples of the types of resin which may be utilized in the present invention.

Among the preferred resins utilized are epoxies because of their high bond strength, versatility, convenience and resistance to most solvents and chemicals. Moreover, when the resin is in the liquid form there can be added curing agents or catalysts which are latent and, when the resin is cured to the B-stage, are still latent and will not cure the resin to the C-stage except upon heating to relatively high temperatures, e.g. 300°–450° F. These properties make epoxy resins or adhesives ideal for the present invention since after the resin is cured to the B-stage (where it is a coating on abrasive particles) the coated abrasive particles can be stored for long periods of time without having to worry about the resin curing to a hard incurable stage which would then prevent molding into a formed shape.

Another important advantage of epoxy resins is the fact that a number of them when in the A-stage are liquids having low viscosity which, as noted supra, aid in forming a uniform coating upon the abrasive particles during mixing.

Examples of epoxy resins which are contemplated in the present invention are those epoxies manufactured under the trademarks "Epi-Rez" and "Epon" or "Epikote."

The above type of epoxy resins, as is normal with most epoxy resins, are the condensation products of epichlorohydrin and bisphenol-A, i.e. 2,2-bis(4-hydroxyphenyl) propane. Depending upon the number of repeating units the resins range from liquids to solids; since the present invention utilizes a liquid to coat the abrasive particles it is preferred to start with epoxy resins having low chain lengths or low molecular weights, e.g. up to 20 repeating units.

As is well known in the art, these epoxy resins can be cured to a final state by the use of curing agents such as amines, polyamides, and acid anhydrides. Since in the present invention the liquid resin is cured to the B-stage and since the catalyst for curing the resin to the C-stage should be present during the initial curing step it is preferred that the catalyst be one which is not activated at the temperatures utilized to cure the resin to the B-stage. Therefore catalysts such as diamino diphenyl sulphone, methyl nadic anhydride, $BF_3$- monoethylamine complex, and certain modified amines are the preferred catalysts when utilizing epoxy resins.

Other preferred resins are the phenolics such as those marketed under the name Plyophene.

The amount of resin utilized in the present invention depends upon many factors such as the strength required, the grain size, and the amount of porosity desired. Generally speaking, anywhere from 2 to 25 percent, by weight based on the entire abrasive tool or wheel, of resin can be utilized but it is preferred to use from 2 to 15 percent by weight. For most purposes from 5 to 10 percent resin is all that is necessary unless very lightweight abrasive is used (e.g., sand) in which case the amount of resin may be as high as 20 percent by weight.

The type of abrasive utilized in the present invention is not critical and any abrasive normally used in grinding operations can also be used in this invention. Examples of such abrasives are alumina ($Al_2O_3$), silicon carbide (either hexagonal or cubic-green grit), garnet, diamond, etc. The amount of abrasive is not particularly critical and can range anywhere from 65 to 98 percent, by weight based on the total weight of the abrasive tool or wheel.

As has been noted hereinabove, it is desirable if there is homogeneously distributed throughout the abrasive tool, lightweight, friable, easily crushable, particles. The purpose of these particles is to create porosity at the grinding surface during use of the tool or wheel. Any friable easily crushable particle can be utilized to obtain the desired effect. Examples of such particles are micro-balloons (glass or phenolic); expanded rhyolitic volcanic glasses such as perlite, pumice, pumicite, obsidian, pitchstone, and volcanic ash; lightweight crystals such as NaCl and $NaNO_2$; glass beads, etc. The amount of lightweight, friable, easily crushable particles in the abrasive tool or wheel depends upon the degree of openness or porosity desired at the grinding surface which, in turn, is dependent upon the particular type of grinding desired. Generally speaking, however, it can be stated that the amount of friable particles should be between 5 to 35 percent, by volume based on the volume of the abrasive tool or wheel. As is known in the art grinding wheels are graded as to openness or porosity by numbers ranging from one to 15 and more. In order to produce a five–seven wheel the amount of friable particles should be from 10 to 12 percent by volume. Thus, it is apparent, that it is easily determined how much friable particles should be added to obtain the type of wheel desired.

In addition to adding friable particles to the abrasive tools of this invention, if extra high tensile strength is desired fibrous material can be included. The particular type of fibers is not at all critical since increasing the tensile strength is not per se dependent upon the tensile strength of the fibers; although, there is some interdependence. Examples of fibers which are contemplated within the scope of this invention are metal fibers, fibers made of thermosetting resins, glass fibers, etc. The length of the fibers is not particularly critical and may range from as little as one thirty-second inch and longer. Similarly, the amount of fiber in the abrasive tool is not critical and is dependent upon the tensile strength desired, the amount of resin utilized, and the amount of friable particles added. Generally speaking, the amount of fibers added can range anywhere from 1 percent to 15 or 20 percent by weight based on the weight of the abrasive tool or wheel.

In order to further illustrate the present invention there is given below certain examples illustrating presently preferred embodiments of the invention.

EXAMPLE I

A premix is made as follows:

One hundred grams of epoxy resin Epon 828), 20 grams of a modified amine as curing agent (Epon curing agent Z), and 75 grams of acetone as a diluent to lower the viscosity of the epoxy resin are mixed together at room temperature and, thereafter, there is added thereto a mixture composed of 1,000 grams of 46 grit $Al_2O_3$, 15 grams of expanded perlite 0 mesh and 2 grams of chrome yellow pigment.

As is known in the art, Epon 828 is a diglycidyl ether of bisphenol A and is a liquid at room temperature having a viscosity at 25° C. of between 100 and 150 poises, an epoxy equivalent of 175 to 210, a specific gravity at 20° C. of 1.167, and an equivalent weight of 85. Epon curing agent Z is a liquid aromatic amine which when used with epoxy resins yields cross linked polymers. Curing agent Z has a viscosity of about 2,000 centipoises at 25° C.

The thus formed mixture of epoxy resin, curing agent and abrasive is blended thoroughly and spread on baking trays approximately one-half inch thick, and placed in an air circulating oven at 180° to 200° F. for 45 to 60 minutes. During this period the mixture may be periodically agitated to prevent caking.

After 60 minutes the material is removed from the oven and allowed to cool to room temperature. When the material is first removed from the oven the individual particles of abrasive ($Al_2O_3$), the perlite (for porosity) and the pigment are all coated with a tacky and soft coating. As the material cools the coating becomes very dry and brittle. During the cooling period the particles are agitated or "fluffed" in order to prevent caking. If desired the resultant individual particles or powder can be screened to remove agglomerates created during the processing or can be milled or ground to produce a relatively uniform particle size. Care should be taken during grinding not to remove or abrade the resin coating.

The thus formed coated abrasive particles and perlite can be stored for many months prior to molding the particles into an abrasive tool.

When it is desired to make an abrasive tool such as a grinding wheel, the premix, made as indicated above, is placed into a suitable mold. In the present example, the premix was placed in a 6 inch mold with a 1¼ inch "tap" (center plug) preheated to 325° F. The mold is then compressed at 1,000 psi in a heated platen hydraulic press and maintained at this temperature and pressure for 5 minutes. The wheel was then removed from the mold, cooled to room temperature and immediately placed on a surface grinder. The wheel removed 60 grams of tool steel ($R_c$ 42-46) with a wheel weight loss of 2 grams. No coolant was used. The metal grinding chips removed were of classical spiral "machined chip" configuration indicating ideal sharpness.

EXAMPLE II

A pre-mix was prepared by intimately admixing 1,500 grams of 36 grit $Al_2O_3$ with resin composition containing 100 grams of Epon 828, 20 grams of curing agent Z and 75 grams of acetone as a diluent to lower the viscosity of the Epon 828. The thus obtained mixture was spread on the baking trays and placed in air circulating oven at 210° F. for about 90 minutes.

When the resin was in the B-stage and was tacky and soft and evenly coated on the abrasive particles the coated abrasive particles were removed from the oven and allowed to cool to room temperature while agitating same.

Again the pre-mix can be allowed to stand for an indefinite period of time before molding into final shape. A 6 inch wheel from the above-identified premix was made as follows:

The premix was placed into a 6 inch mold which was then compressed at 1,500 psi at 340° F. for 3 minutes. The wheel was then removed from the mold and cooled to room temperature. The thus formed wheel had a steel removal rate comparable to an A-24-L-9-V wheel but had a 50 times better removal rate on aluminum than the above-identified wheel. The wheel was then rotated rapidly and was found that it did not burst until it reached 16,000 rpm.

EXAMPLE III

A premix was made as follows:
A mixture of abrasive particles and opener was made having the following composition: 750 grams of 120 grit silicon carbide, 250 grams of 46 grit green silicon carbide and 10 grams of 100 mesh expanded perlite. The above mixture was then intimately admixed with the following resin composition: 200 grams of a 65 percent solution of phenolic resin in isopropyl alcohol to which 50 grams of isopropyl alcohol was added.

The thus obtained resin and abrasive particle mixture was then evenly spread out on an oven tray and placed in an oven at 220° F. for 1½ hours. Thereafter, the coated abrasive particles were removed from the resin and allowed to cool at room temperature with agitation. It was found that the phenolic resin was evenly coated on the individual abrasive particles (and also the expanded perlite particles) and that the resin had cured to a fusible but hard mass.

The thus obtained premix was placed in a 7 inch mold which was then compressed at 1,000 psi at a temperature of 325° F. for 20 minutes. The wheel was then allowed to cool to room temperature and was immediately placed on a surface grinder. It was found that this wheel removed more metal versus wheel weight loss on tool steel than did a GC-120-A11-VR wheel.

EXAMPLE IV

Fifteen hundred grams of 60 grit $Al_2O_3$, 100 grams of glass fiber, one thirty-second inch long, and 3 grams of phthalocyanine blue (a solid pigment) were intimately admixed together and preheated to 250° F. The preheated mixture was then admixed with 135 grams of Epon 828 and 27 grams of Epon curing agent Z. The reason for preheating the abrasive particles was so that when it was mixed with the resin the resin would also become heated and thereby lower the viscosity of the resin so that a uniform coating of the resin around both the glass fibers and the abrasive particles could be obtained. The resin and the abrasive particles were maintained at 210° F. for 15 minutes with agitation so that the epoxy resin was B-staged. Thereafter it was cooled to room temperature with agitation and then placed in a 6 inch mold and molded at 1,000 psi at 340° F. for 3 minutes.

The wheel thus formed had excellent metal removal properties with very low wheel loss.

EXAMPLE V

Sixteen hundred grams of 36 grit $Al_2O_3$, 100 grams of glass fiber, and 100 grams of (NaCl) NaCl were mixed together and preheated to 250° F. The preheated mixture thus obtained was mixed with 135 grams of Epon 828 and 27 grams of Epon curing agent Z. The resin and abrasive particle mixture was then held at 210° F. for 15 minutes under agitation and then allowed to cool. It was found that the resin had been cured to the B-stage and that an even uniform coating of resin was found on the glass fibers, the salt, and the $Al_2O_3$. The NaCl was utilized to produce openness on the surface of the wheel.

The thus obtained mixture was then placed in a 6 inch mold and molded at 340° F. and at a pressure of 1,000 psi for 3 minutes. The wheel was then allowed to cool and it was shown that the wheel did not burst until it reached 17,400 rpm. The wheel was excellent to grind tool steel, aluminum, brass and titanium.

EXAMPLE VI

Eleven hundred grams of 120 grit silicon carbide, 100 grams of salt (NaCl), 100 grams of glass fiber, and 50 grams of expanded perlite were intimately admixed together and preheated to 250° F. The preheated mixture was then admixed with a mixture containing 150 grams of Epon 828, 75 grams of novolak (Resylac 2238), 10 grams of dicyandiamide (as curing agent), and 0.3 grams of benzyldimethylamine. The resin mixture and abrasive mixture were maintained at 210° F. for 15 minutes with periodic agitation to prevent caking, at which time the resin was B-staged. Thereafter the mixture was cooled to room temperature, with periodic agitation, and then placed in a 6 inch mold and molded at 1,000 psi at 340° F. for 3 minutes.

The wheel thus formed had excellent metal removal properties with very low wheel loss. In addition, because of the addition of the novolak resin the bond was brittle and therefore there was little or no "smearing" of the resin during the grinding operation.

In the above examples the various additives (glass fiber, salt, and perlite) were all coated with a liquid resin while in the presence of the abrasive particles. However, this is not necessary since the glass fibers and the porosity forming materials could be coated separately from the abrasive and thereafter mixed together prior to molding same.

It is also to be understood that the various temperatures, resins, abrasive particles, additives, proportions, pressures, etc. referred to in the preferred exemplary embodiments are simply illustrative of types and ranges which may be used and are for the purpose of illustration only and are not to be considered limiting.

In the foregoing examples after the particles of abrasive, opener, etc. have been coated with the liquid resin and the resin cured to a fusible solid the coated particles are cooled to room temperature so that the resin coating is dry and brittle before molding under heat and pressure. It is noted that it is only necessary to cool the coated particles to a temperature where the resin is dry and brittle and that cooling to ambient temperature is not necessary

I claim:

1. A method for economically and efficiently producing an abrasive tool having high tensile strength which comprises:
   a. mixing an abrasive composition containing abrasive particles, with a liquid, multi-stage, thermosetting resin in the A-stage selected from the group consisting of phenol-aldehydes epoxies, alkyds, polyesters, urea-aldehydes, melamine-aldehydes and polyurethanes, and coating substantially all of the individual particles with said resin;
   b. heat advancing said resin to the B-stage, while the resin is in contact with said particles, to a fusible solid coating on said particles and forming individual particles coated with said fusible resin; and
   c. placing said resin coated particles in a mold and heating the particles sufficiently to render the resin tacky and fusible and, concurrently, applying sufficient pressure to form a coherent mass of a size and shape corresponding to said mold and applying sufficient heat and pressure to cure said resin to the C-stage in said mold to a hard and infusible state while said coated particles are in contact with each other to form a high tensile strength bond between said particles.

2. A method according to claim 1 wherein in step (c) the resin coated particles placed in the mold include lightweight, easily crushable, friable inert filler particles uniformly dispersed throughout the abrasive particles, said friable inert particles being present in an amount of from 5 to 35 percent, by volume, based on the total volume of the abrasive tool.

3. A method according to claim 1 wherein said abrasive composition contains lightweight, easily crushable inert filler, friable particles uniformly dispersed throughout the abrasive particles, said friable particles being present in amount of from 5 to 25 percent, by volume, based on the total volume of the abrasive tool.

4. A method according to claim 1 wherein the amount of said resin is from 2 to 25 percent, by weight, based on the weight of the abrasive tool.

5. A method according to claim 4 wherein the amount of the resin is from 2 to 15 percent, by weight, based on the weight of abrasive tool.

6. A method according to claim 1 wherein in step (a) the abrasive composition contains fibers in an amount of from 1 to 20 percent, by weight, based on the weight of the abrasive tool.

7. A method according to claim 3 wherein the lightweight, easily crushable inert filler, friable particles are expanded rhyolitic volcanic glasses.

8. A method according to claim 1 wherein the abrasive tool is a grinding wheel.

9. The method according to claim 1 including also employing said abrasive grit resin coating as the sole bonding agent in said wheel.

10. A method according to claim 1 wherein the liquid, multi-stage, thermosetting resin is epoxy.

11. A method according to claim 4 wherein the liquid, multi-stage, thermosetting resin is epoxy.

12. A method according to claim 8 wherein the liquid, multi-stage, thermosetting resin is epoxy.

* * * * *